United States Patent [19]

Brausfeld et al.

[11] Patent Number: 4,566,196

[45] Date of Patent: Jan. 28, 1986

[54] VARIABLE POINT POSITION DETERMINING ARRANGEMENT

[75] Inventors: Walter Brausfeld, Hanover; Helmut Göttling, Isernhagen; Rudolf Möller, Gehrden; Peter Müller, Hanover; Gerhard Scharnowski, Gehrden, all of Fed. Rep. of Germany

[73] Assignee: WABCO Westinghouse Steuerungstechnik GmbH & Co., Hanover, Fed. Rep. of Germany

[21] Appl. No.: 647,092

[22] Filed: Sep. 4, 1984

[30] Foreign Application Priority Data

Sep. 2, 1983 [DE] Fed. Rep. of Germany ....... 3331720

[51] Int. Cl.⁴ ............................................... G01B 5/00

[52] U.S. Cl. ........................... 33/125 R; 33/DIG. 15; 33/181 AT; 33/172 E

[58] Field of Search ......... 33/DIG. 15, 125 R, 172 E, 33/172 R, 181 AT, 181 R, 180 AT, 180 R, 169 R, 143 L, 147 N

[56] References Cited

U.S. PATENT DOCUMENTS 4,195,411 4/1980 Gergey ......................... 33/172 E X

FOREIGN PATENT DOCUMENTS 409047 2/1910 France .......................... 33/DIG. 15

388228 6/1965 Switzerland .......................... 33/560

*Primary Examiner*—Harry N. Haroian

*Attorney, Agent, or Firm*—G. E. Hawranko

[57] ABSTRACT

A variable point position determining arrangement includes a housing having a stationary portion secured to a fixed member as, for example working cylinder, and an extendable portion secured to a member movable in relation to the fixed member, as for example piston rod. An elastic element, such as a tension spring, is connected between the stationary portion and an extendable portion of the housing. Such elastic element is stretched or relaxed an amount proportionate to the travel of the movable member. The displacement transducer having an actuator rod and a projecting pin connected to the elastic element at approximately a middle point, follows movement of the elastic element and outputs a distance signal which is a function of the movement of the actuator rod and elastic element. The distance signal can be fed to a control circuit to derive the position value of the movable member therefrom.

14 Claims, 1 Drawing Figure

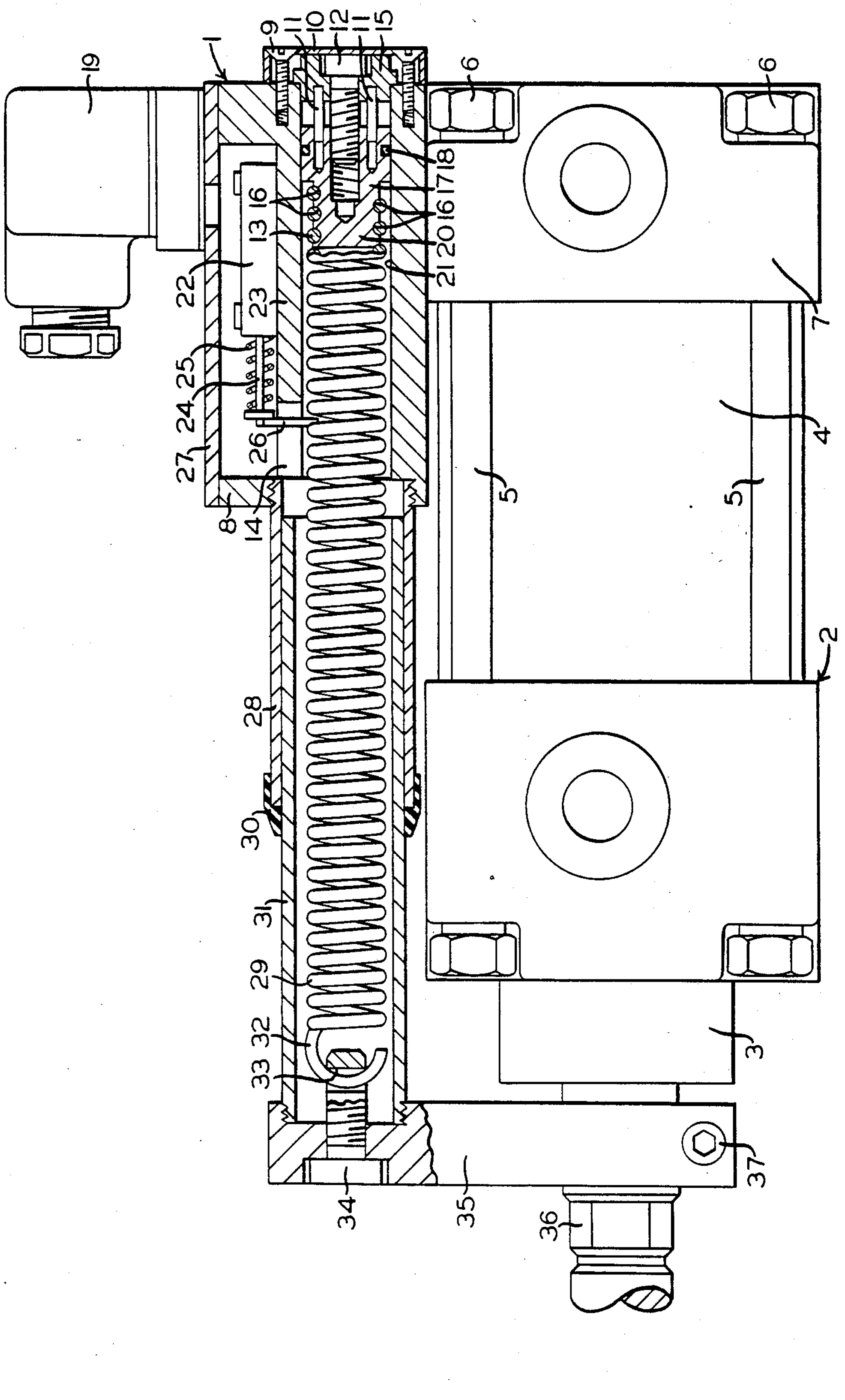
19
1
9
11
10
12
11
15
6
6
1718
16
16
13
20
21
22
23
25
24
26
27
8
14
7
4
5
5
2
28
30
31
29
32
33
34
35
36
37
3

VARIABLE POINT POSITION DETERMINING ARRANGEMENT

BACKGROUND OF THE INVENTION

This invention relates to a variable point position determining arrangement especially as can be used for determining the position of a piston within a working cylinder. Such position determining arrangements, in addition to determining the position of the piston, can also be used to precisely control the stroke of the piston as a function of a predetermined value. Furthermore, such position determining arrangements, in addition to measuring the position and precisely controlling the stroke of a piston, can also be used to measure the position of any second point which is variable in relation to a first point which is fixed. Typically, it has been a well-known practice in this field to use a stepped-down gear unit driven by a geared rack connected to the piston rod as a means of measuring and controlling the position and stroke of the piston rod. Such an arrangement would require a potentiometer to be connected to the stepped-down gear unit which would give a signal as a function of the distance traveled by the piston rod. Such a configuration for the measuring of a piston position has the disadvantage of being relatively expensive. To guarantee smooth operation and a satisfactory precision of the apparatus, the gear wheels and the stepped-down gear unit and the geared rack must be manufactured to precise tolerances. But even with a very precise manufacture of the individual parts, such as, shafts, bearings, gear wheels and gear racks, imprecisions after a long-term operation cannot be entirely avoided since, over time, play develops between the gear wheels and at the bearing points. A further disadvantage of this existing configuration is the inability to operate where the movable object is moving in a nonaxial or curved manner. Such movement of the piston rod, for example, would result in a binding of the geared arrangement typically used by existing configurations.

Yet another disadvantage of existing configurations is the inability to adapt or be retrofitted to an existing working cylinder. To attempt to retrofit a gear-type measuring arrangement on a working cylinder would require extensive disassembly of that working cylinder and would therefore seem unreasonable.

SUMMARY OF THE INVENTION

It is, therefore, an object of the invention to provide a variable point position determining arrangement whereby machining and manufacturing operations are substantially reduced in complexity and in cost.

It is a further object of the invention to provide such a position determining arrangement which can measure a variable point where the movable object has traveled in a nonaxial or curved manner.

It is yet a further object of the invention to provide such a position determining arrangement wherein maintenance operations and costs are greatly reduced.

It is yet another object of the invention to provide such a position determining arrangement which can be adapted readily to existing working cylinders or like devices where one object is movable in relation to a stationary object.

Briefly, the invention consists of a housing having a stationary portion which can be secured to the stationary point, the working cylinder housing for example, and an extendable portion which can be secured to the movable portion, the piston rod for example. An elastic member is secured within the housing between the stationary portion and the extendable portion and is extended out in response to movement of the movable object, the piston rod for example. A displacement transducer engages a portion of the elastic member such that, a distance signal is generated in response to movement of the movable object. An adjustable screw-cap arrangement is connected to the stationary portion of the housing and engages the elastic member such that adjustments to that elastic member can be readily made from an external point. An evaluating circuit can be mounted on the housing which would receive the distance signal and derive a position value of the movable object in relation to the fixed object using such distance signal.

BRIEF DESCRIPTION OF THE DRAWING

FIG. 1 is an elevational view, partly in section, of a variable point position determining arrangement constructed in accordance to the invention.

DESCRIPTION AND OPERATION

As seen in FIG. 1, a variable point position determining arrangement 1 is used, in this situation, with a working cylinder 2. The working cylinder 2 essentially consists of a cylindrical tube 4, cylindrical base 7, cylindrical cover 3, and a working piston (not shown) guided in the cylindrical tube 4. A piston rod 36, connected to the working piston, extends through the cylindrical cover 3.

Secured at a point along the circumference of the cylindrical base 7 is a housing 8, which on the side facing the cylindrical cover 3, has a tubular extension 28. On the end of the piston rod 36 extending through the cylindrical cover 3, a bracket member 35 is secured by means of a bolt arrangement 37. The bracket member 35 surrounds the piston rod 36 at a point adjacent the cylindrical cover 3 when the piston rod 36 is in the fully retracted position. Secured to the bracket member 35 and extending back over the working cylinder 2 is tubular member 31 which runs parallel to the longitudinal axis of the working cylinder 2. The tubular member 31 extends telescopically into the tubular extension 28 in the housing 8. An anchor bolt 34 having a recess 33 extends through the bracket member 35 and into the tubular member 31. The tension spring 29, which serves as an elastic element, is suspended through the tubular member 31 and tubular extension 28. An eye-shaped end 32 of the tension spring 29 is inserted through the recess 33 of the anchor bolt 34 such that, the tension spring 29 is extended or relaxes by movement of the piston rod 36-bracket member 35 arrangement. A graduated plug 17 is disposed within the housing 8 on the end which is secured to the cylindrical base 7. The graduated plug 17 has a reduced diameter portion 20 on which is formed thread-like recesses 16. A second spring end 13, opposite the eye-shaped end 32, has at least two coil sections threaded into the recesses 16 so that the second spring end 13 is held in position with the graduated plug 17. The graduated plug 17 exhibits a guide ring 18 running circumferentially and is arranged so that it is displaceable in a bore 21 of housing 8, running parallel to the longitudinal axis of the working cylinder 2. By means of an adjusting screw 12, which is held in a closing cover 15 on the end of the bore 21 and screwed into the graduated plug 17, the second spring end 13 of the tension spring 29 is secured. To prevent a loosening of the graduated plug 17, there are at least two pins 11 on the cover 15 which fit into corresponding recesses on the graduated plug 17 so that when the adjusting screw 12 loosens, there is only a displacement of the graduated plug 17 in the longitudinal direction. A cap 10 is clamped over the cover 15 and attached by means of bolts 9 to housing 8 so that there is no possibility of an accidental loosening of the cover 15 or an unintentional movement of the adjusting screw 12.

Disposed above the graduated plug 17 and separated from the tension spring 29 by a middle wall 23 is a displacement transducer 22 which can be, for this situation, a slide potentiometer. The displacement transducer 22 has an actuator rod 24 and a projecting pin 26 connected to the end of the actuator rod 24. The projecting pin 26 extends through a slot 14 formed in the middle wall 23 toward the tension spring 29. The projecting pin 26 lies on a turn of the tension spring 29 and is held against rotational movement by a compression spring 25 having a small spring constant. The compression spring 25 is attached to the housing of the displacement transducer 22 and acts against the actuator rod 24 in the tension direction of the tension spring 29. The housing 8 is closed by cover 27. Extending from the cover 27 is a cable duct 19 which allows access to the displacement transducer 22 for electrical connections thereto. A control circuit (not shown) can be connected to the displacement transducer 22 such that, the distance signal output by the displacement transducer 22 can be evaluated and the position of the piston rod is determined relative to the stationary point. The control circuit can also be used to vent or pressurize the working cylinder 2 using the distance signal generated by the displacement transducer 22.

To prevent the penetration of moisture and dirt into the spring chamber and housing 8 on the open end of the tubular extension 28, there is a wiper ring 30 which contacts the tubular member 31.

In operation, it is assumed that piston rod 36 is to be moved approximately halfway out of the working cylinder 2 and that the control circuit (not shown) is activated. By means of the solenoid valve apparatus (not shown), fluid pressure flows into the right-hand side of the working cylinder 2 and exerts a force moving the piston to the left. The piston rod 36 travels outside the working cylinder 2. The tension spring 29, attached on one side to the graduated plug 17 and on the other side to the bracket member 35 connected to the piston 36, is put under tension by this process.

The total travel of the spring 29 is the same as the distance traveled by the piston rod 36. By positioning the displacement transducer 22 to engage the tension spring 29 above and near the graduated plug 17 as opposed to near the bracket member 35, the actuator rod 24 travels a distance which is substantially equivalent to the reduced excursion of the tension spring 29 at this point. In this manner, the distance traveled by the actuator rod 24 is stepped-down in relation to the distance traveled by the piston rod 36 and the advantages of a short stroke electromechanical displacement transducer can be fully realized.

The displacement transducer 22 outputs a voltage to the control circuit (not shown), the magnitude of which represents the distance traveled by the actuator rod 24 stepped-down in relation to the displacement of the piston rod 36 and proportional to the displacement of the piston rod 36. The control circuit can receive the distance signal as a voltage output from the displacement transducer 22 and derive the distance traveled by the piston rod 36 by masking the measured distance signal voltage to a table of predetermined values which correspond to said distance measurement. The control circuit can be connected to a solenoid valve apparatus (not shown) which controls the flow of fluid pressure to the working cylinder 2 to operate the piston rod 36. In this manner, the position of the piston rod cannot only be determined but can be controlled as well.

With the principal embodiment of the invention now having been fully detailed, it should be appreciated that alternate embodiments are possible as well. As an example, any suitable elastic element can be used as a substitute for the tension spring 29.

Furthermore, the application of the variable point position determining arrangement described above is not limited to the working piston example described herein, but can also be used where the position of two parts which are movable in relation to one another is to be determined or specified.

Although the hereinabove-described forms of embodiments of the invention constitute preferred forms, it can be appreciated that other modifications may be made thereto without departing from the scope of the invention as set forth in the appended claims.

Having now described the invention, what we claim as new and desire to secure by Letters Patent, is:

1. A variable point position determining arrangement secured in a stationary manner on one end to a fixed point member, and on a second end to a member movable in relation to the fixed point member, said variable point position determining arrangement comprising:

(a) a housing having a stationary portion secured to the fixed point member and an extendable portion secured to the movable member;

(b) a bracket member secured between said extendable portion of said housing and the movable member;

(c) tracking means having at least a portion formed of an elastic material connected on one end to said bracket member and on a second end to the fixed point member for following movement of the movable member in at least one plane;

(d) adjusting means connected between said tracking means and the fixed point member for adjusting a tension value of said elastic portion of said tracking means;

(e) following means having a rod portion connectable to said elastic portion for following said tracking means a proportionate distance in relation to movement of the movable member, said following means further outputting a distance signal as a function of such proportionate following movements; and (f) evaluating means for receiving such distance signal and deriving a position value of the movable member in relation to the fixed point object therefrom.

2. A position determining arrangement, as set forth in claim 1, wherein said stationary portion of said housing has a fixed tubular projection, and said extendable portion of said housing is a tubular extension which slidably fits within said fixed tubular projection.

3. A position determining arrangement, as set forth in claim 1, wherein said tracking means includes a tension spring stretchable between said stationary portion of said housing and said extendable portion of said housing.

4. A position determining arrangement, as set forth in claim 3, wherein said tracking means further includes a screw mounted in said bracket member and having a recess formed therein, said tension spring further having an eyelet formed on one end which is insertable into said recess of said screw.

5. A position determining arrangement, as set forth in claim 1, wherein said adjusting means includes a graduated plug adjustably movable within a bore formed in said stationary portion of said housing, said tension spring being fixedly connected to said graduated plug, said adjusting means further including a stationary cap disposed adjacent said bore and an adjusting screw extending through said stationary cap and threadably engaging said graduated plug such that, adjustment of said adjusting screw moves said graduated plug within said bore thereby adjusting tension on said tension spring.

6. A position determining arrangement, as set forth in claim 5, wherein said adjusting means further includes at least two restraining pins disposed between said graduated plug and said stationary cap such that, relative rotational movement between said graduated plug and said stationary cap is prevented.

7. A position determining arrangement, as set forth in claim 1, wherein said following means includes a slide potentiometer displacement transducer having an actuator rod extendable therethrough, and a projecting pin connected to said actuator rod and engaging said tension spring such that, stretching of said tension spring moves said actuator rod a distance proportionate to movement of said tension spring.

8. A position determining arrangement, as set forth in claim 7, wherein said following means further includes a torsion spring disposed in surrounding relation to said actuator rod such that, rotational movement of said actuator rod and projecting pin is substantially prevented.

9. A position determining arrangement, as set forth in claim 2, wherein a wiper ring is disposed on one end of said fixed tubular projection of said housing through which said movable tubular extension moves.

10. A position determining arrangement, as set forth in claim 3, wherein said adjusting means includes a graduated plug adjustably movable within a bore formed in said stationary portion of said housing, said tension spring being fixedly connected to said graduated plug, said adjusting means further including a stationary cap disposed adjacent said bore and an adjusting screw extending through said stationary cap and threadably engaging said graduated plug such that, adjustment of said adjusting screw moves said graduated plug within said bore thereby adjusting tension on said tension spring.

11. A position determining arrangement, as set forth in claim 10, wherein said adjusting means further includes at least two restraining pins disposed between said graduated plug and said stationary cap such that, relative rotational movement between said graduated plug and said stationary cap is prevented.

12. A position determining arrangement, as set forth in claim 10, wherein said following means includes a slide potentiometer displacement transducer having an actuator rod extendable therethrough, and a projecting pin connected to said actuator rod and engaging said tension spring such that, stretching of said tension spring moves said actuator rod a distance proportionate to movement of said tension spring.

13. A position determining arrangement, as set forth in claim 12, wherein said following means further includes a torsion spring disposed in surrounding relation to said actuator rod such that, rotational movement of said actuator rod and projecting pin is substantially prevented.

14. A position determining arrangement, as set forth in claim 2, wherein said bracket member is connected to said tubular extension at substantially a right angle on one end and, at the opposite end, said bracket member is connected to the movable member at substantially a right angle such that, movement of said tubular extension is substantially parallel to movement of the movable portion.

* * * * *